(No Model.) 2 Sheets—Sheet 1.

A. T. DOWDEN.
POTATO DIGGER.

No. 316,015. Patented Apr. 21, 1885.

Witnesses:
W. T. Anderson.
Lem Stanton

Inventor:
Ashford T. Dowden,
By Thomas G. Orwig, Atty.

(No Model.) 2 Sheets—Sheet 2.

A. T. DOWDEN.
POTATO DIGGER.

No. 316,015. Patented Apr. 21, 1885.

Witnesses:
W. T. Anderson.
Lem Stanton.

Inventor:
Ashford T. Dowden,
By Thomas G. Orwig, Atty.

UNITED STATES PATENT OFFICE.

ASHFORD T. DOWDEN, OF PRAIRIE CITY, IOWA.

POTATO-DIGGER.

SPECIFICATION forming part of Letters Patent No. 316,015, dated April 21, 1885.

Application filed August 18, 1884. (No model.)

*To all whom it may concern:*

Be it known that I, ASHFORD T. DOWDEN, a citizen of the United States, residing at Prairie City, in the county of Jasper and State of Iowa, have invented a new and useful Potato-Harvester, of which the following is a specification.

My invention relates to improvements in potato-harvesters or potato-digging machines having inclined plows or diggers combined with endless carriers, to dig, elevate, and carry rearward potatoes, earth, and vines, and to separate them by dropping the refuse and retaining the potatoes.

The objects of my improvements are, first, to separate the earth and vines from the potatoes as these are carried upward and backward from the plow; second, to deposit the potatoes in a wagon or other receptacle carried alongside of the harvester.

Figure 1:
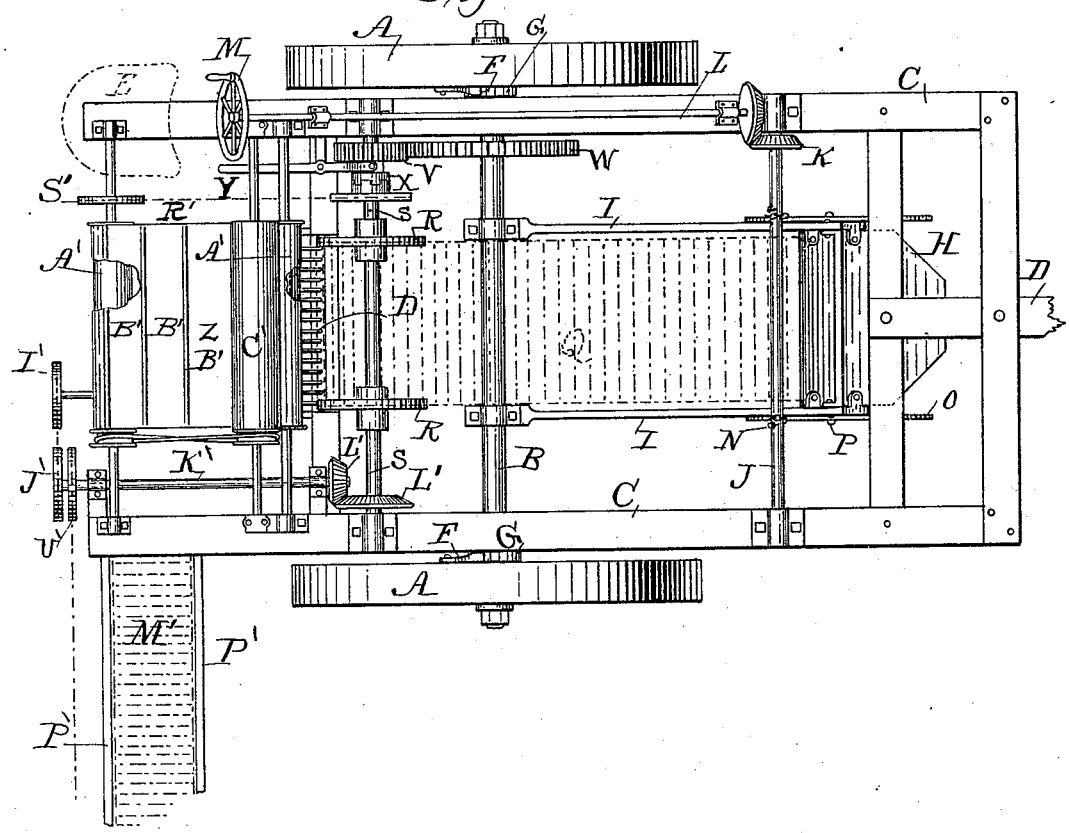
Figure 2:
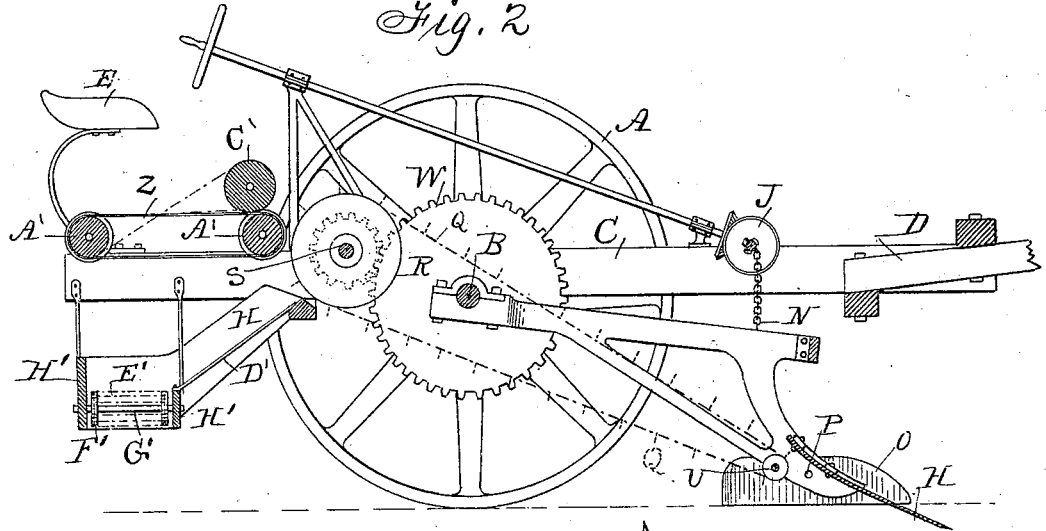
Figure 3:
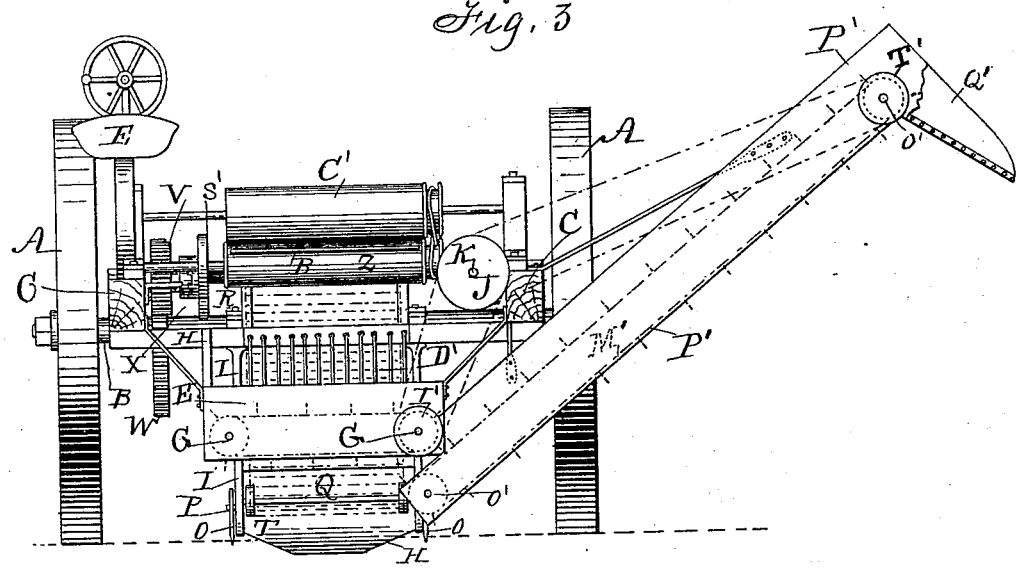

Figure 1 of my accompanying drawings is a top view of my machine. Fig. 2 is a longitudinal section of my machine. Fig. 3 is a rear view of my machine. Figs. 4, 5, 6, and 7 are detailed views of my endless carrier.

Similar letters refer to similar parts throughout the several views.

A are two wheels mounted loosely on an axle, B, and supporting the frame C of the machine, to which the pole D and driver's seat E are attached. The wheels are provided with pawls F, which engage ratchet-wheels G, attached to the axle in such a manner that the axle will turn with the wheels when the machine is moving forward, but will remain stationary when it is moving backward.

H is a plow or digger attached to the forward end of a frame, I, whose rear end is secured to the axle B in such a manner that it is free to turn upon the same. Above this frame is a shaft, J, attached to the main frame, having at one of its ends the bevel-wheel K, engaging a similar wheel on an inclined shaft, L, having a hand-wheel, M, fixed to its rear end and immediately in front of the driver's seat. The plow-frame I is connected with the shaft J by chains N in such a manner that the plow can be raised or lowered by turning the wheel M, thus enabling the driver to regulate the depth of the cut. At each side of the plow are upright metal guards O, pivoted upon the frame I at P. These are designed to prevent the potatoes from being thrown aside and to guide them upon the carrier Q. By pivoting them to the adjustable frame they will remain horizontal while the frame and plow is set at various angles relative to the plow.

Q is an endless carrier constructed of iron rods placed at such a distance apart that dirt and other refuse may fall through while potatoes will be retained. The construction of this carrier will be hereinafter more particularly described. This carrier is supported at its upper end and driven by two sprocket-wheels, R, fixed to the shaft S, and at its lower end by similar smaller wheels, T, upon a shaft, U, supported by the lower part of the plow-frame I. The shaft S has at one end a cog-wheel, V, engaging a larger cog-wheel, W, upon the axle B. The cog-wheel V is loose upon its shaft and is connected with a clutch, X, which engages a similar clutch fixed to the shaft. This clutch is operated by the handle Y. This arrangement enables the driver to stop and start the carrier Q at will. Upon the rear part of the frame, immediately behind the shaft S, is an endless carrier, Z, supported by two rollers, A', secured to the frame. The rear roller A' receives its motion from the shaft S by means of a chain, R', and sprocket-wheel S'.

The carrier Z is made of canvas or other suitable material, and has transverse slats B' placed at intervals upon its outer surface.

Above the forward roller A' and slightly to the rear of it is a larger roller, C', which is driven by a crossed belt from the rear roller A', so that it revolves in the opposite direction to the carrier Z. This arrangement is designed to seize the vines carried upon the carrier Q between the roller C' and forward roller A'. After passing these rollers the vines are carried by the carrier Z and dropped behind the machine. The roller C' is mounted in flexible bearings, so that it will adjust itself to the varying quantities of vines passing under it. Below the carrier Z is an inclined grating, D', made of small iron rods, which receives the contents of the carrier Q and conducts them upon a lower transverse carrier, E', which is similar to the carrier Q in its construction, allowing a still further separation of refuse. The carrier E' is carried upon sprocket-wheels F', attached to shafts G' supported by the frame H'. One of these shafts has upon its rear end a drive-wheel, I', driven from the wheel J' upon the shaft K', which receives its motion from the shaft S by means of bevel-wheels L'. The lower carrier, E', carries the potatoes and remaining refuse outward and deposits them upon the elevator M'. This elevator consists of a carrier constructed in the same manner as the ones described, and is carried upon sprocket-wheels N' on shafts O', supported by the inclined frame P'. The upper shaft O' carries a drive-wheel, T', driven from wheel U' on shaft K'. This elevator carries the potatoes and refuse, if any remain, upward, separating them on the way, and deposits the potatoes upon the inclined chute Q', the bottom of which is formed of iron rods, as shown. From this chute the potatoes fall into a wagon or other receptacle beneath.

Figure 4:
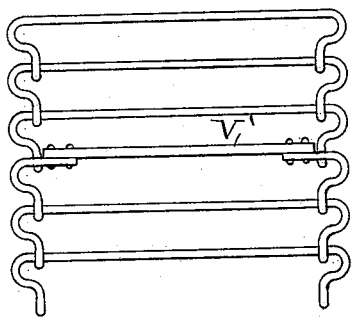
Figure 5:
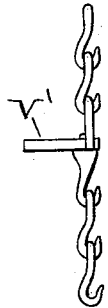
Figure 6:
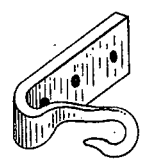
Figure 7:
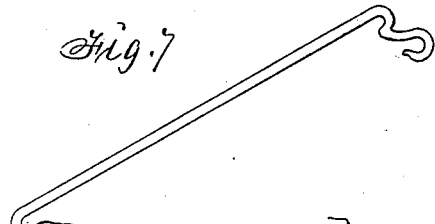

My carrier is constructed of iron rods bent in the manner shown in Fig. 7, and connected as shown in Figs. 4 and 5. At intervals pieces formed as shown by Fig. 6 are inserted, and to these are bolted upright pieces of wood V', against which the potatoes and refuse lodge.

As the machine advances the plow enters the ground and the potatoes, earth, and vines slide upward upon its inclined surface and are deposited upon the endless carrier Q, which carries them upward and backward, allowing the loose dirt and refuse to escape during the ascent, and deposits them upon the inclined grating D', (the vines being seized by the roller C' and endless carrier Z and carried to the rear,) which conducts them to the transverse carrier E', upon which they are carried to the elevator M', which discharges them from the chute Q'.

From the peculiarity of the construction of my carriers the dirt and refuse are given ample opportunity to escape during the passage from the ground to the wagon.

I claim as my invention and desire to secure by Letters Patent—

1. An endless carrier, composed of iron rods having hooks on their ends, and metal straps having hooks on their ends and rigidly connected by straight bars of wood, in combination with a plow having a shaft, U, and a driver-shaft, S, having fixed sprocket-wheels R, substantially as shown and described, to operate in the manner set forth, for the purposes specified.

2. The endless carrier Q, the reversely-inclined grate D', the vine-carrier Z, the self-adjusting roller C', the transverse carrier E', and the elevator M, arranged and combined with a carriage and plow to operate in the manner set forth, for the purposes stated.

3. The improved potato-harvester composed of the following elements, to wit: a two-wheeled carriage, an adjustable frame carrying a plow and pivoted guards at the sides of the plow, an endless carrier extending backward and upward from the plow, a vine-carrier at the rear and top end of the inclined carrier, a grate extending backward and downward from the inclined carrier, a transverse and horizontal carrier at the rear and lower end of the grate, and an elevator inclined outward from the end of the horizontal carrier, substantially as and for the purposes set forth.

ASHFORD T. DOWDEN.

Witnesses:
   THOMAS G. ORWIG,
   CHAS. L. DAHLBERG.